United States Patent
Prescott et al.

(10) Patent No.: US 8,328,162 B2
(45) Date of Patent: Dec. 11, 2012

(54) PIVOTABLE CONTROL VALVE ASSEMBLY FOR WATER TREATMENT DEVICE

(75) Inventors: Russell E. Prescott, Kingston, NH (US); Perrin T. Prescott, Exeter, NH (US)

(73) Assignee: R.E. Prescott Co., Inc., Exeter, NH (US)

( * ) Notice: Subject to any disclaimer, the term of this patent is extended or adjusted under 35 U.S.C. 154(b) by 814 days.

(21) Appl. No.: 12/403,279

(22) Filed: Mar. 12, 2009

(65) Prior Publication Data

US 2009/0230341 A1 Sep. 17, 2009

Related U.S. Application Data

(60) Provisional application No. 61/036,050, filed on Mar. 12, 2008.

(51) Int. Cl.
*F16K 31/00* (2006.01)
(52) U.S. Cl. .......................... 251/289; 251/290; 137/270
(58) Field of Classification Search .......... 137/269–271; 251/289–291
See application file for complete search history.

(56) References Cited

U.S. PATENT DOCUMENTS

| | | | |
|---|---|---|---|
| 2,735,047 A * | 2/1956 | Garner et al. | 335/245 |
| 3,482,604 A * | 12/1969 | Fleckenstein et al. | 137/624.2 |
| 3,616,820 A * | 11/1971 | Fleckenstein et al. | 137/624.13 |
| 3,874,412 A * | 4/1975 | Fleckenstein et al. | 137/624.13 |
| 3,962,089 A * | 6/1976 | Fulukawa | 210/191 |
| 4,290,451 A * | 9/1981 | Fleckenstein et al. | 137/624.15 |
| 4,313,825 A * | 2/1982 | Fleckenstein et al. | 210/89 |
| 4,633,897 A * | 1/1987 | Effenberger | 137/315.35 |
| 5,529,282 A * | 6/1996 | Lebkuchner | 251/129.12 |
| 6,206,028 B1 * | 3/2001 | Holden et al. | 137/271 |
| 6,206,042 B1 * | 3/2001 | Channell et al. | 137/624.2 |
| 6,444,127 B1 * | 9/2002 | Vaughan et al. | 210/662 |
| 2007/0045185 A1 * | 3/2007 | Prescott et al. | 210/634 |

* cited by examiner

*Primary Examiner* — Eric Keasel
*Assistant Examiner* — David Colon Morales
(74) *Attorney, Agent, or Firm* — Grossman Tucker Perreault & Pfleger, PLLC

(57) ABSTRACT

A pivotable control valve assembly may be used with a water treatment device in a water treatment system. A pivotable control valve assembly may be pivotable relative to the water treatment device to allow user controls on the pivotable control valve assembly to be oriented in a desired user access position. In a water treatment system including a plurality of water treatment devices, for example, one or more pivotable control valve assemblies may be pivoted such that user controls for each of the water treatment devices are in desired user access positions.

11 Claims, 5 Drawing Sheets

US 8,328,162 B2

PIVOTABLE CONTROL VALVE ASSEMBLY FOR WATER TREATMENT DEVICE

CROSS-REFERENCE TO RELATED APPLICATIONS

This application claims the benefit of U.S. Provisional Patent Application Ser. No. 61/036,050 filed Mar. 12, 2008, which is fully incorporated herein by reference.

TECHNICAL FIELD

The present invention relates to water treatment systems and more particularly, to a pivotable control valve assembly for use on a water treatment device in a water treatment system.

BACKGROUND INFORMATION

Water treatment systems are commonly used in water supply systems. In a residential water supply system, for example, water softeners, acid neutralizers, iron/manganese removal systems, arsenic removal systems, and aeration systems may be used to filter and/or treat the water being supplied from a water source (e.g., from a well or city water supply). Such systems may require coupling multiple filters, tanks and other devices into the system such that the water is filtered and/or treated before being supplied into the home. To connect such systems, pipes, valves and other equipment often must be coupled together to direct water into the tanks and filters. Plumbing the pipes, valves and other equipment into an existing water supply system may be tedious and time consuming.

Some existing water treatment devices have a control valve assembly rigidly connected to a top of the water treatment device (e.g., to the top of the tank) to control water treatment by controlling the water passing in to and out of the device. The user often prefers to have the control valve assembly oriented such that the user can easily access the controls on the control valve assembly. Plumbing such a water treatment device into a water supply system may thus present further challenges because of the limited orientation of the control valve assembly. In systems where multiple water treatment devices (e.g., a water softener, a radon removal system and an arsenic removal system) are installed, the plumbing is further complicated because there is a desire to have the control valve assemblies on each of the devices oriented to facilitate user access. Also, servicing of the control valve assembly may be more difficult when the control valve assembly only has one position.

BRIEF DESCRIPTION OF THE DRAWINGS

These and other features and advantages will be better understood by reading the following detailed description, taken together with the drawings wherein.

DETAILED DESCRIPTION

A pivotable control valve assembly, consistent with embodiments of the present invention, may be used with a water treatment device in a water treatment system. A pivotable control valve assembly may be pivotable relative to the water treatment device to allow user controls on the pivotable control valve assembly to be oriented in one or more desired user access positions. In a water treatment system including a plurality of water treatment devices, for example, one or more pivotable control valve assemblies may be pivoted such that user controls for each of the water treatment devices are in desired user access positions and/or to facilitate servicing or repair.

As used herein, "couple" or "coupling" is not limited to a direct mechanical connection and may include an indirect mechanical connection that is made through other components or structures. As used herein, "pivot" or "pivotable" is not limited to the ability to turn 360° around and may include the ability to turn within a range of angles less than 360°.

Figure 1:
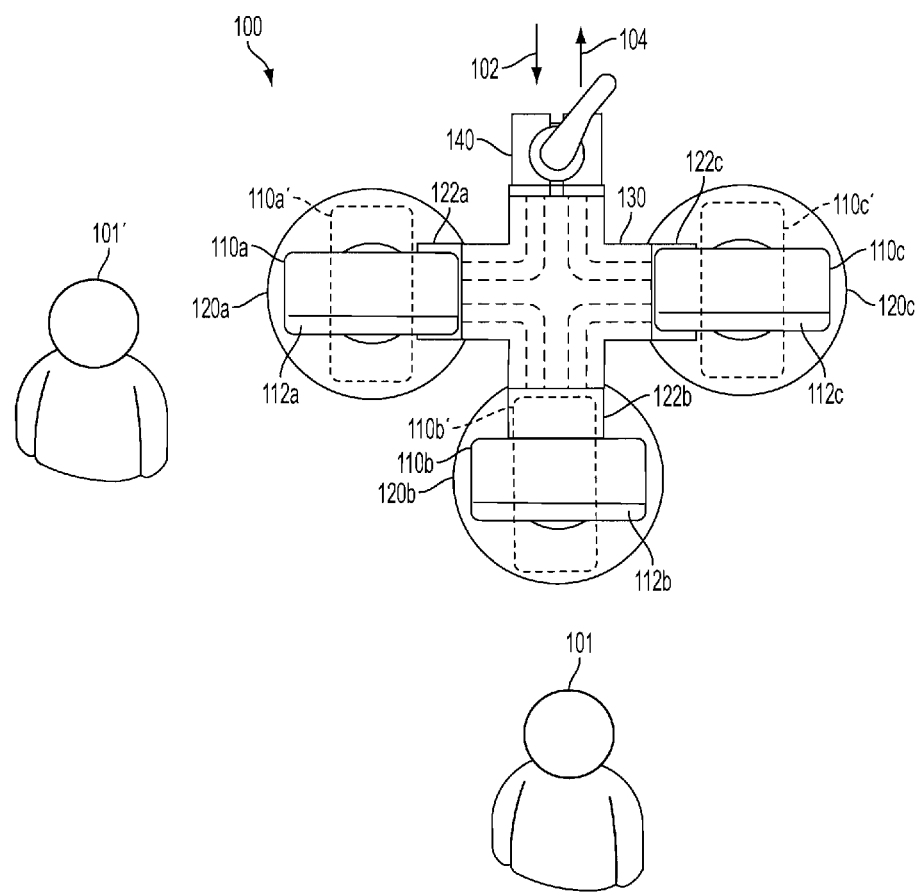
FIG. 1 is a schematic view of a water treatment system including water treatment devices with pivotable control valve assemblies, consistent with embodiments of the present invention.

Referring to FIG. 1, one embodiment of a water treatment system 100 may include a plurality of water treatment devices 120a-120c and one or more pivotable control valve assemblies 110a-110c coupled to the water treatment devices 120a-120c. The water treatment system 100 directs water from a supply line 102 through water treatment devices 120a-120c to a delivery line 104. The supply line 102 may supply water from a water source such as a well or city water supply. The delivery line 104 may provide water to a building, such as a residential home. The water treatment systems 100 may be coupled, for example, to a residential water supply system at the point of entry. The water treatment system 100 may also be configured for use in a commercial water supply system.

The control valve assemblies 110a-110c may control the flow of water in to and out of the respective water treatment devices 120a-120c, for example, according to the various water treatment cycles or operations. In a water softener, for example, a control valve assembly may provide different positions (e.g., a service position, a backwash position, and various rinse positions) allowing water to flow according to different water softener treatment cycles or operations. The control valve assemblies 110a-110c may include user controls on control sides 112a-112c to allow the user to control valve functionality such as when certain treatment cycles or operations occur (e.g., based on a time of day or number of days). Other types of controls may also be provided.

In the illustrated embodiment, the pivotable control valve assemblies 110a-110c are positioned in user access positions such that control sides 112a-112c of the control valve assemblies 110a-110c face a user 101 at a particular position. If the user is in the position of user 101', however, the pivotable control valve assemblies 110a-110c may be pivoted to other user access positions 110a'-110c' such that the control sides 112a-112c face the user 101'. The pivotable control valve assemblies 110a-110c may also be pivoted to any position for service or repair. If the side opposite the control sides 112a-112c provides access to the drive mechanisms, for example, the pivotable control valve assemblies 110a-110c may be pivoted 180° to allow the user 101, 101' access for service or repair without having to move to a different location. Thus, a user may be able to view the control sides 112a-112c for all of the control valve assemblies 110a-110c and access any side of the control valve assemblies 110a-110c for service or repair without moving to different locations and without having to plumb the water treatment devices with any particular location or orientation.

In the illustrated embodiment, the water treatment devices 110a-110c are coupled to three inlet/outlet sides of a manifold block 130 using coupling devices 122a-122c. The coupling devices may be coupled to the control valve assemblies 110a-110c and/or to the water treatment devices 110a-110c (e.g., to the tanks). The manifold block 130 may also be coupled directly to the control valve assemblies 110a-110c and/or to the water treatment devices 110a-110c. A valve 140 may be coupled between the manifold block 130 and the supply line 102 and delivery line 104. In an exemplary embodiment, the valve 140 may be a by-pass valve such as the type known to those skilled in the art for use in residential water systems.

In other embodiments, the control valve assemblies 110a-110c and/or water treatment devices 120a-120c may be coupled to a modular flow directing coupling system including multiple configurable components that facilitate installation of the water treatment systems, such as the type described in U.S. patent application Ser. No. 11/551,936 (U.S. Patent Application Publication No. 20070045185) and U.S. Provisional Application Ser. No. 61/032,833, both of which are fully incorporated herein by reference. The modular flow directing coupling systems may be arranged in various configurations to form modular water treatment systems. In such a system, the pivotable valve control assembly provides the added flexibility of allowing water treatment devices to be coupled at different locations in the system and with different orientations without hindering user access.

A modular flow directing coupling system may be used in any system where water is directed through a plurality of water treatment devices 120a-120c. The modular flow directing coupling system may eliminate additional plumbing connections for the additional water treatment devices. Examples of water treatment devices include, but are not limited to, water softeners, acid neutralizers, iron/manganese removal systems, arsenic removal systems, other contaminant removal systems, and aeration systems. Water treatment devices may also include water heaters or other devices that alter the temperature or other conditions of the water. Water treatment devices may further include tanks or other devices that store or allow water to pass through as part of a treatment process. The water treatment devices coupled using the modular flow directing coupling system may include redundant water treatment devices (e.g., redundant arsenic removal systems) or may include different water treatment devices (e.g., an acid neutralizer and a water softener) One embodiment may include first and second filter tanks including a filter medium that removes or reduces the level of contaminants in the water as the water flows through the medium, such as the type disclosed in greater detail in U.S. patent application Ser. No. 11/211,415 (U.S. Patent Application Publication No. 2007/0045160) filed on Aug. 25, 2005, incorporated herein by reference. In an arsenic removal system, for example, the filter medium may include a hybrid ion exchange resin such as the type available under the name ArsenXnp™ from SolmeteX Inc. and Purolite Inc.

Figure 2:
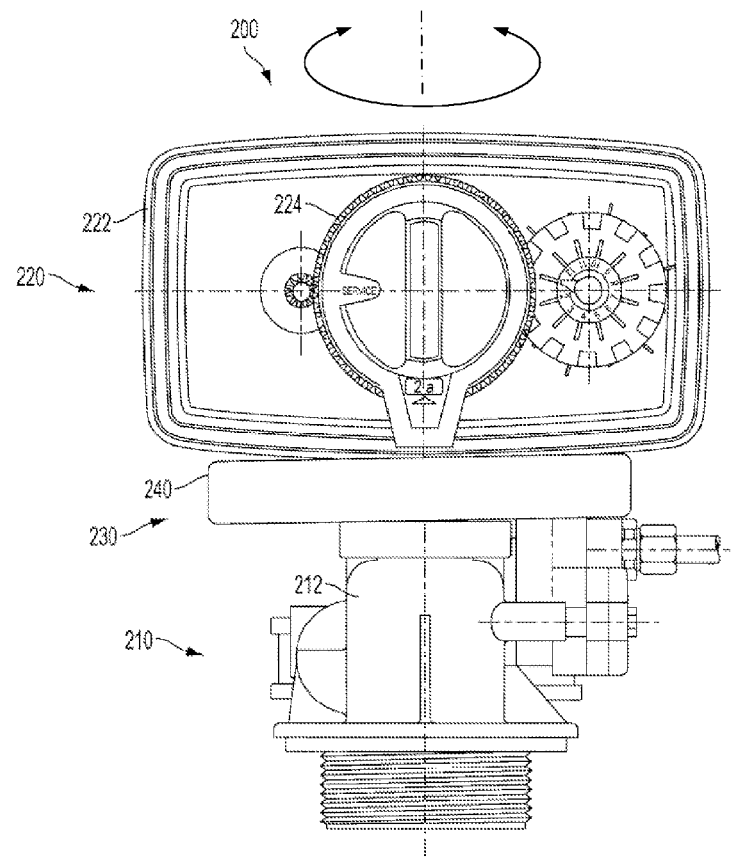
FIG. 2 is a side view of one embodiment of a pivotable control valve assembly.
Figure 3:
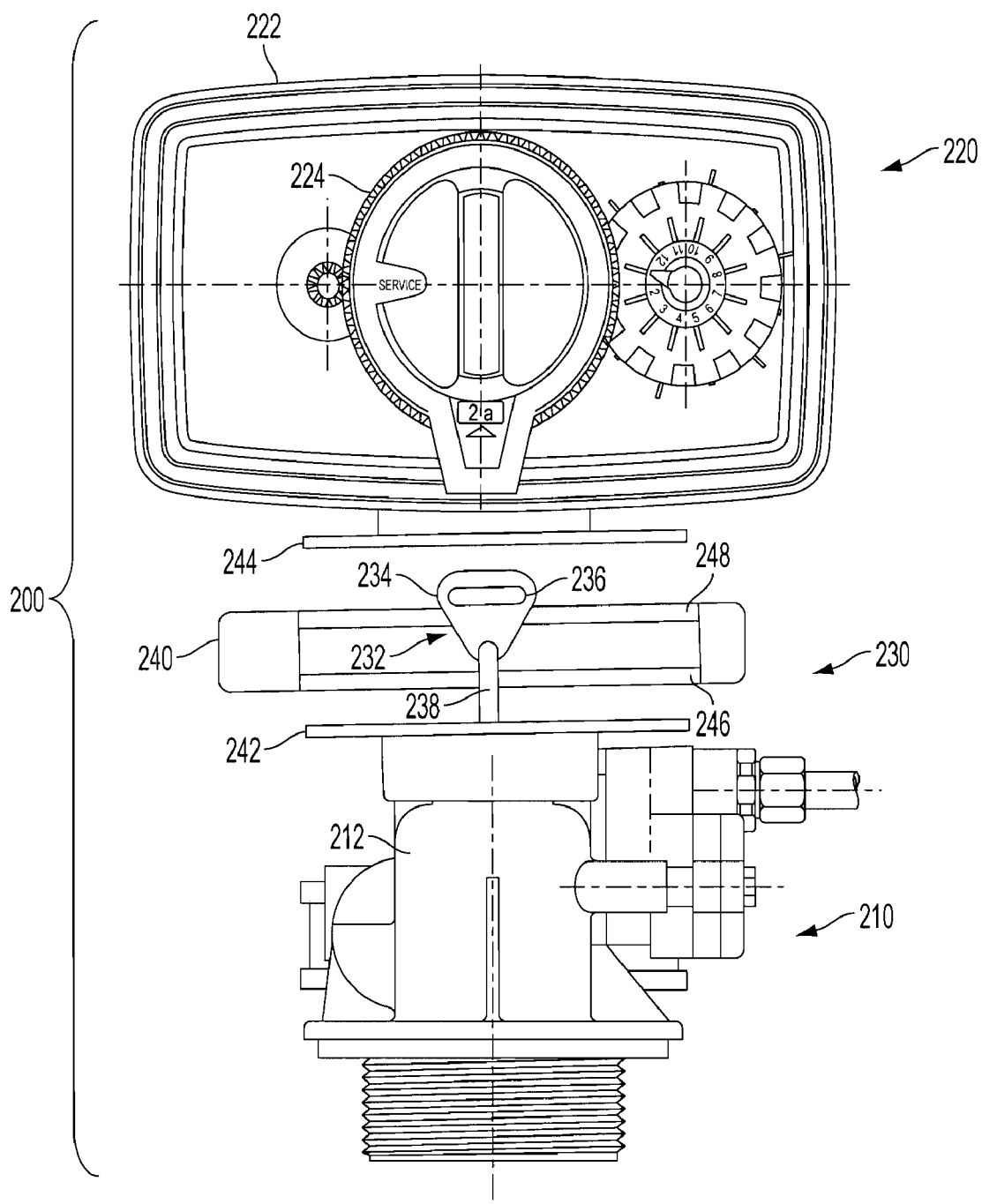
FIG. 3 is an exploded side view of the pivotable control valve assembly shown in FIG. 2.

Referring to FIGS. 2 and 3, one embodiment of a pivotable control valve assembly 200 is described and shown in greater detail. The pivotable control valve assembly 200 may include a valve unit 210 and a drive unit 220 pivotably coupled to the valve unit 210 with a coupling mechanism 230. The valve unit 210 may include a valve body 212 and a valve piston (not shown) that moves within the valve body 212 to control the flow of fluid through the valve body 212 (e.g., through an inlet and an outlet). The drive unit 220 may include a housing 222 and a drive mechanism (not shown) located within the housing 222 to drive the valve piston. The drive unit 220 may also include a user control 224 on at least one side of the housing 220 and coupled to the drive mechanism to allow the user to control the function of the drive mechanism and thus the valve positioning (e.g., the timing of the valve positioning).

As shown in FIG. 3, the coupling mechanism 230 may include a valve coupling 232 operably coupled between the drive mechanism in the drive unit 220 and the valve piston in the valve unit 210. The valve coupling 232 generally extends from the valve unit 210 into the drive unit 220 and may be pivotable relative to the valve unit 210 and/or the drive unit 220 such that the drive unit 220 may pivot relative to the valve unit 210 while remaining coupled via the valve coupling 232. One embodiment of the valve coupling 232 includes a slotted head 234 with a slot 236 that receives a portion of the drive mechanism and a rod 238 that is coupled to the valve piston, as will be described in greater detail below.

According to one embodiment, the coupling mechanism 230 also includes a clamp 240 that clamps a flange 242 coupled to the valve unit 210 and a flange 244 coupled to the drive unit 220. The clamp 240 may include retaining portions 246, 248 that retain the flanges 242, 244 within the clamp 240 and allow one or both of the flanges 242, 244 to pivot such that the drive unit 220 is pivotable relative to the valve unit 210.

Figure 4:
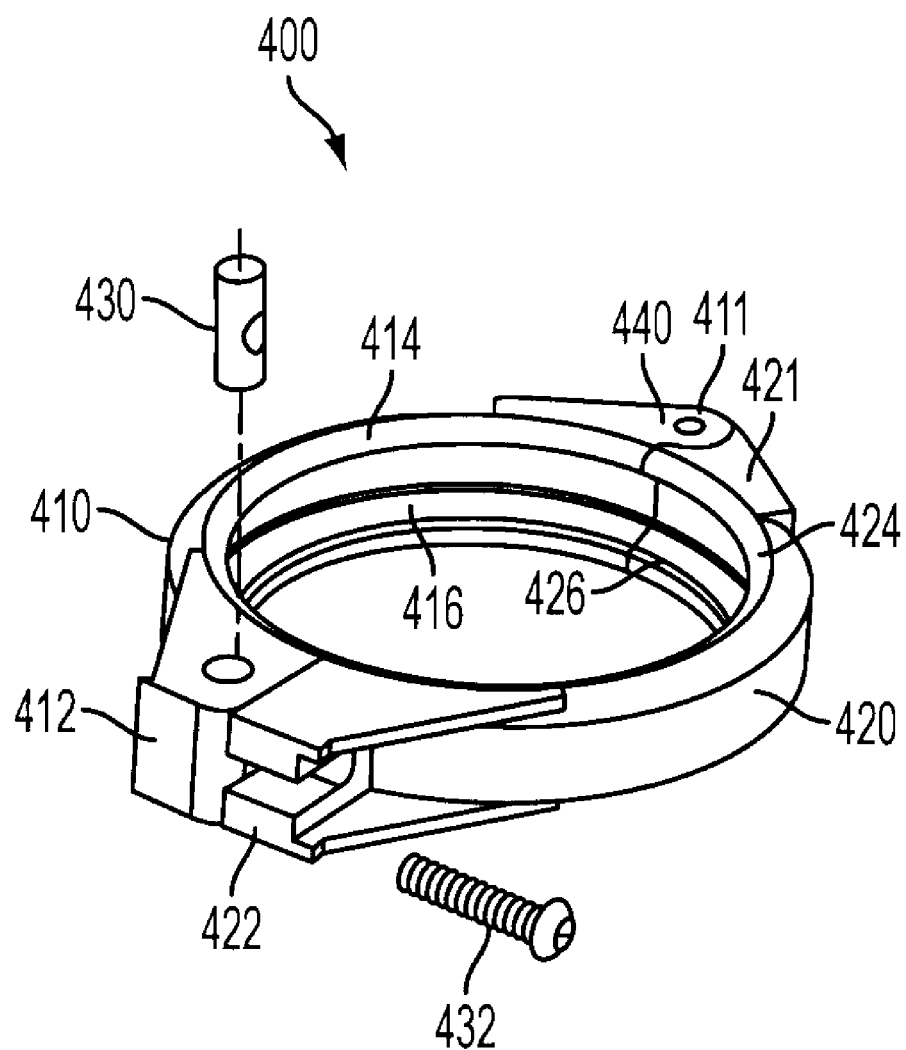
FIG. 4 is a perspective view of one embodiment of a clamp that may be used in a pivotable control valve assembly.

FIG. 4 shows one embodiment of a clamp 400 that may be used to pivotably couple a drive unit to a valve unit of a pivotable valve control assembly. The clamp 400 includes first and second clamp members 410, 420 that are hinged at one end 411, 421 and coupled at the other end 412, 422. Each of the clamp members 410, 420 may include retaining portions 414, 416, 424, 426 that retain the flanges coupled to the drive unit and valve unit, respectively, as described above. The clamp members 410, 420 may be opened by separating the ends 412, 422 and pivoting at the ends 411, 421. The clamp members 410, 420 may then be closed around the flanges with the flanges positioned between the retaining portions 414, 416, 424, 426.

The clamp 400 may include a pivot pin 440 at the hinged ends 411, 421 and may include a coupling mechanism 430, 432 at the coupling ends 412, 422. The coupling mechanism 430, 432 may include a rod 430 received in one coupling end 412 and a threaded fastener 432 received in the other coupling end 422 and threadably engaged with an internally threaded portion of the rod 430. Other types of hinge mechanisms may be used to hinge the clamp members 410, 420 and other types of coupling mechanisms may also be used to secure the coupled ends 412, 422. Other types of clamps with different configurations capable of clamping the flanges while allowing the flanges to pivot may also be used.

Figure 5:
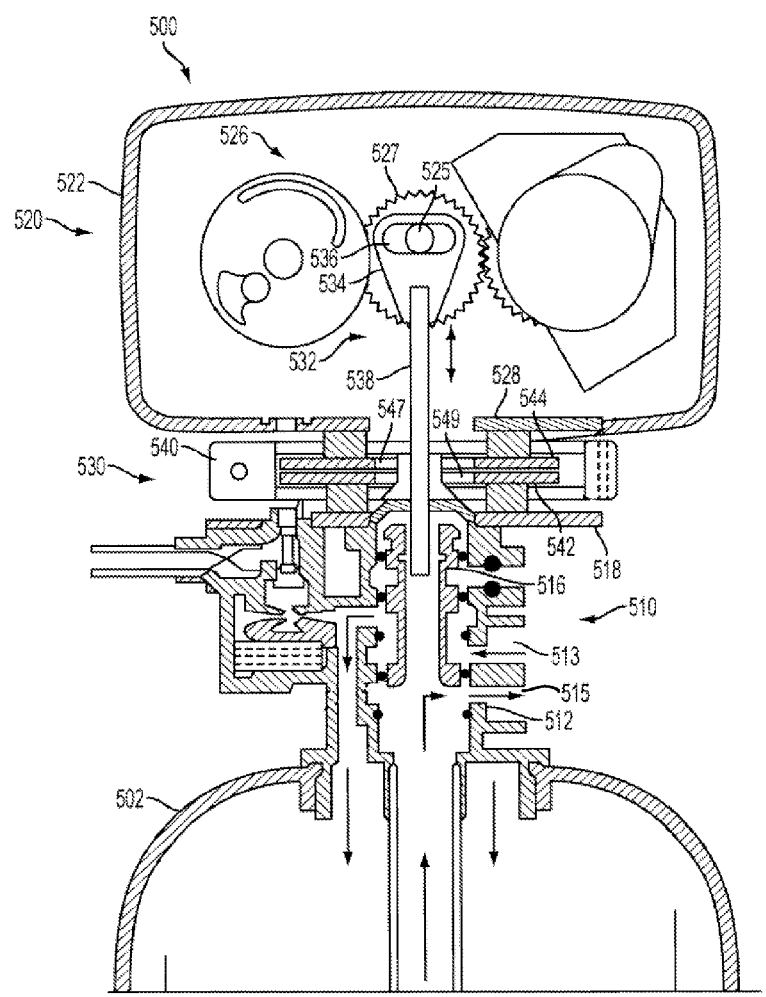
FIG. 5 is a side cross-sectional view of an embodiment of a pivotable control valve assembly.

Referring to FIG. 5, another embodiment of a pivotable valve control assembly 500 is shown illustrating the coupling and the operation of the valve in greater detail. According to this embodiment, the pivotable valve control assembly 500 includes a drive unit 520 pivotably coupled to a valve unit 510 with a coupling mechanism 530. The drive unit 520 includes a housing 522 enclosing a drive mechanism 526, which may include one or more gears 527. An extension 525 (e.g., a pin or screw) may extend from the drive mechanism 526 (e.g., from a main gear 527) and engage a slot 536 in a slotted head 534 of a valve coupling 532. The valve unit 510 includes a valve body 512 with a valve piston 516 coupled to a shaft 538 of the valve coupling 532. The valve body 512 may define at least an inlet 513 and an outlet 515 that allow fluid to flow in to or out of a tank 502 coupled to the valve unit 510 depending upon the position of the valve piston 516.

In operation, rotation of the gear 527 causes the extension 525 to move the valve coupling 532, thereby causing the valve piston 516 to move between different positions within the valve body 512 to control flow through the inlet 513 and/or outlet 515. In one example, the pivotable control valve assembly 500 may include a valve unit 510 and a drive unit 520 with a function and structure similar to those used on the water softener available under the name Model 5600 ECONO-MINDER®.

In the exemplary embodiment, the valve piston 516 may be pivotable within the valve body 512 such that pivoting of the drive unit 520 causes the valve coupling 532 to pivot the valve piston 516. The drive unit 520 may thus pivot relative to the valve unit 510 while remaining coupled and operable. In other embodiments, the valve coupling 532 may be pivotably coupled to the valve piston 516 allowing the valve coupling 532 to pivot without pivoting the valve piston 516 and/or the slotted head 534 may be pivotably coupled to the shaft 538 allowing the head 534 to pivot without pivoting the shaft 538. Various other coupling mechanisms may be used to operably couple the drive mechanism 526 to the valve piston 516 while allowing the relative pivoting motion.

According to this embodiment, the coupling mechanism 530 may also include a clamp 540 that clamps a first flange 542 and a second flange 544. The first flange 542 may be secured to a plate 518 coupled to the valve unit 510 and the second flange 544 may be secured to a plate 528 coupled to the drive unit 520. The flanges 542, 544 may include apertures 547, 549 with the shaft 538 of the valve coupling 532 extending from the drive unit 520 through the apertures 547, 549 to the valve piston 516. The flanges 542, 544 may also be mounted or secured to the valve unit 510 and the drive unit 520 in other ways or may be one-piece with the valve body 512 and the housing 522. Although the exemplary embodiment has the ability to pivot a full 360° around, this is not necessarily a limitation. Pivotable control valve assemblies that pivot only 180° may still allow a wide range of user access positions.

A pivotable control valve assembly retrofit kit may also be provided to retrofit existing control valve assemblies in which the drive unit is rigidly coupled to the valve unit. The existing control valve assembly may thus be converted into a pivotable control valve assembly as described herein. The retrofit kit may include the flanges (e.g., flanges 242, 244, 542, 544) configured to be coupled to the drive unit and the valve unit, the valve coupling (e.g., valve coupling 232, 532) with a shaft that is longer than the valve coupling shaft in the existing assembly, and the clamp (e.g., clamp 240, 400, 540) configured to clamp the flanges.

According to one method of retrofitting the existing control valve assemblies, the drive unit (e.g., drive unit 220, 520) is removed from the valve unit (e.g., valve unit 210, 510). The existing valve coupling may then be removed and replaced with the longer valve coupling (e.g., valve coupling 232, 532). Where the valve coupling is secured to the valve piston (e.g., valve piston 516), the valve piston may be replaced with the valve coupling. The flanges (e.g., flanges 242, 244, 542, 544) may then be coupled to the drive unit and valve unit and the clamp (e.g., clamp 240, 400, 540) clamped around the flanges. The flanges may be coupled to the drive unit and valve unit and then clamped, or one or both of the flanges may be coupled to the drive unit or the valve unit after being clamped. For example, the bottom flange (e.g., flange 242, 542) may be attached first to the valve unit and the top flange (e.g., flange 244, 544) may be positioned on the bottom flange without coupling to the drive unit. The flanges may be clamped and then the top flange may be coupled to the drive unit.

According to one embodiment, the existing control valve assembly may include the drive unit rigidly coupled to the valve unit with a plate. To retrofit according to this embodiment, the plate (e.g., plate 528) may be removed when the drive unit is removed from the valve unit. The plate may then be reattached between the top flange and the drive unit.

The ability to retrofit existing control valve assemblies allows water treatment devices to be more easily added to a system and saves space. In particular, when the pivotable control valve assemblies are used together with a modular coupling system, such as those described in U.S. patent application Ser. No. 11/551,936 and U.S. Provisional Application Ser. No. 61/032,833, the plumbing and installation may be greatly facilitated, the required space for the system may be reduced, and the usability and serviceability of the system may be improved. Referring back to FIG. 1, for example, if the water treatment system 100 initially included only one or two water treatment devices, one or more additional water treatment devices with pivotable control valve assemblies could easily be added without requiring additional components (and space) to provide a desired orientation for the additional water treatment devices. The existing water treatment device(s) already installed in the system could also be retrofitted to provide pivotable control valve assemblies.

In summary, a pivotable control valve assembly may be used with a water treatment device in a water treatment system to facilitate plumbing the water treatment device into the system and reduce the space used while allowing a user to access user controls and/or service the control valve assembly in different user access positions.

Consistent with one embodiment, a pivotable control valve assembly includes a valve unit configured to be coupled to a water treatment device. The valve unit includes a valve body and a valve piston configured to move between at least two positions in the valve body to control a flow of fluid through the valve unit and in to and out of the water treatment device. The pivotable control valve assembly also includes a drive unit including a housing and a drive mechanism located in the housing. The drive mechanism is configured to drive the valve piston. The pivotable control valve assembly further includes a coupling mechanism pivotably coupling the valve unit to the drive unit. The coupling mechanism includes a valve coupling coupled between the drive mechanism in the drive unit and the valve piston in the valve unit. At least the valve coupling is configured to pivot when the drive unit pivots.

Consistent with another embodiment, a water treatment system includes at least one water treatment device and a pivotable control valve assembly pivotably coupled to the water treatment device such that the pivotable control valve assembly is pivotable to a plurality of different user access positions.

Consistent with a further embodiment, a method is provided for installing a water treatment system including at least one water treatment device and a pivotable control valve assembly pivotably coupled to the water treatment device. The method includes fluidly coupling the water treatment device to a water system and pivoting the pivotable control valve assembly to a user access position.

Consistent with yet another embodiment, a method is provided for retrofitting an existing control valve assembly with a pivotable coupling mechanism. The method includes: removing a drive unit from a valve unit of the control valve assembly; replacing a valve coupling in the control valve assembly with a longer valve coupling; coupling first and second flanges to the drive unit and the valve unit, respectively; and clamping the flanges such that the flanges are pivotable relative to each other.

Consistent with yet another embodiment, a pivotable control valve assembly retrofit kit is provided for retrofitting an existing control valve assembly to be a pivotable control valve assembly. The retrofit kit includes first and second flanges configured to be coupled to a drive unit and a valve unit, respectively, of the existing control valve assembly; a valve coupling configured to be operably coupled between the drive unit and the valve unit, the valve coupling being longer than a valve coupling in the existing control valve assembly; and a clamp configured to clamp the first and second flanges such that the first and second flanges are pivotable relative to each other.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A pivotable control valve assembly comprising:
   a valve unit configured to be coupled to a water treatment device, the valve unit including a valve body and a valve piston configured to move between at least two positions in the valve body to control a flow of fluid through the valve unit and in to and out of the water treatment device;
   a drive unit including a housing and a drive mechanism located in the housing, the drive mechanism being configured to drive the valve piston, wherein the drive unit includes a user control mounted on at least one side of the housing, the user control being coupled to the drive mechanism to allow a user to control the drive mechanism, positioning of the valve piston, and the flow of fluid in to and out of the water treatment device; and
   a coupling mechanism pivotably coupling the valve unit to the drive unit, the coupling mechanism including a valve coupling coupled between the drive mechanism in the drive unit and the valve piston in the valve unit, wherein at least the valve coupling is configured to pivot when the drive unit pivots such that the user control is pivoted to a plurality of different user access positions in which the drive unit can actuate the valve unit.

2. The pivotable control valve assembly of claim 1 wherein the valve piston is pivotable within the valve unit and is configured to pivot with the valve coupling.

3. The pivotable control valve assembly of claim 1 wherein the valve coupling includes a slotted head defining a slot, and wherein the drive mechanism includes an extension slidably received in the slot of the slotted head such that movement of the drive mechanism causes the extension to move the valve coupling.

4. The pivotable control valve assembly of claim 1 wherein the valve body defines at least an inlet and an outlet, and wherein the valve piston is configure to move to at least two positions allowing fluid to flow through the inlet and outlet, respectively.

5. The pivotable control valve assembly of claim 1 wherein the coupling mechanism comprises a clamp coupling the valve unit to the drive unit such that the clamp allows the drive unit to pivot.

6. The pivotable control valve assembly of claim 5 further comprising first and second flanges, the first flange being coupled to the valve unit and the second flange being coupled to the drive unit, and wherein the first and second flanges are clamped within the clamp.

7. The pivotable control valve assembly of claim 6 wherein the flanges include apertures, and wherein the valve coupling extends through the apertures in the flanges.

8. A water treatment system comprising:
   at least one water treatment device; and
   a pivotable control valve assembly pivotably coupled to the water treatment device such that the pivotable control valve assembly is pivotable to a plurality of different user access positions, the pivotable control valve assembly comprising:
      a valve unit configured to be coupled to the water treatment device, the valve unit including a valve body and a valve piston configured to move between at least two positions in the valve body to control a flow of fluid through the valve unit and in to and out of the water treatment device;
      a drive unit including a housing and a drive mechanism located in the housing, the drive mechanism being configured to drive the valve piston, wherein the drive unit includes a user control mounted on at least one side of the housing, the user control being coupled to the drive mechanism to allow a user to control the drive mechanism, positioning of the valve piston, and the flow of fluid in to and out of the water treatment device; and
      a coupling mechanism pivotably coupling the valve unit to the drive unit, the coupling mechanism including a valve coupling coupled between the drive mechanism in the drive unit and the valve piston in the valve unit, wherein at least the valve coupling is configured to pivot when the drive unit pivots such that the user control is pivoted to a plurality of different user access positions in which the drive unit can actuate the valve unit.

9. The water treatment system of claim 8 further comprising a plurality of water treatment devices and a plurality of pivotable control valve assemblies pivotably coupled to the water treatment devices, respectively.

10. The water treatment system of claim 8 further comprising a flow directing coupling system, and wherein the water treatment device is coupled to an inlet/outlet side of the flow directing coupling system.

11. The water treatment system of claim 10 further comprising a plurality of water treatment devices coupled to a plurality of inlet/outlet sides of the flow directing coupling system and a plurality of pivotable control valve assemblies pivotably coupled to the water treatment devices, respectively.

* * * * *